(12) United States Patent
Vogel

(10) Patent No.: US 7,113,954 B2
(45) Date of Patent: Sep. 26, 2006

(54) SYSTEM AND METHOD FOR GENERATING A TAXONOMY FROM A PLURALITY OF DOCUMENTS

(75) Inventor: Claude Vogel, Foster City, CA (US)

(73) Assignee: Entrleva, Inc., Reston, VA (US)

( * ) Notice: Subject to any disclaimer, the term of this patent is extended or adjusted under 35 U.S.C. 154(b) by 33 days.

(21) Appl. No.: 10/704,138

(22) Filed: Nov. 10, 2003

(65) Prior Publication Data

US 2004/0148155 A1 Jul. 29, 2004

Related U.S. Application Data

(63) Continuation of application No. 09/289,174, filed on Apr. 9, 1999, now Pat. No. 6,665,681.

(51) Int. Cl.
G06F 17/30 (2006.01)
(52) U.S. Cl. ............... 707/101; 707/3; 715/531
(58) Field of Classification Search ............ 707/6, 707/3, 101, 5, 1
See application file for complete search history.

(56) References Cited

U.S. PATENT DOCUMENTS

| | | | |
|---|---|---|---|
| 4,370,707 A * | 1/1983 | Phillips et al. ........... 707/104.1 |
| 5,146,552 A | 9/1992 | Cassorla et al. |
| 5,157,783 A | 10/1992 | Anderson et al. |
| 5,257,185 A | 10/1993 | Farley et al. |
| 5,265,065 A | 11/1993 | Turtle |
| 5,325,298 A | 6/1994 | Gallant |
| 5,371,807 A | 12/1994 | Register et al. |
| 5,625,767 A | 4/1997 | Bartell et al. |
| 5,655,116 A | 8/1997 | Kirk et al. |
| 5,694,594 A | 12/1997 | Chang |
| 5,708,822 A | 1/1998 | Wical |
| 5,708,825 A | 1/1998 | Sotomayor |
| 5,768,580 A | 6/1998 | Wical |
| 5,819,258 A | 10/1998 | Vaithyanathan et al. |
| 5,819,260 A | 10/1998 | Lu et al. |
| 5,826,025 A | 10/1998 | Gramlich |
| 5,832,495 A | 11/1998 | Gustman |
| 5,832,499 A | 11/1998 | Gustman |
| 5,940,821 A | 8/1999 | Wical |
| 5,963,965 A | 10/1999 | Vogel |
| 5,991,709 A | 11/1999 | Schoen |
| 5,991,714 A | 11/1999 | Shaner |
| 6,014,680 A | 1/2000 | Sato et al. |
| 6,023,697 A * | 2/2000 | Bates et al. ............... 707/4 |
| 6,070,158 A | 5/2000 | Kirsch et al. |
| 6,073,170 A | 6/2000 | Sumita et al. |

(Continued)

FOREIGN PATENT DOCUMENTS

EP 0 631 245 3/2000

OTHER PUBLICATIONS

A Delphi Group White Paper; "Taxonomy & Content Classification—Market Milestone Report", 28 pages, 2002 Delphi Group, Boston Mass. www.delphigroup.com.

(Continued)

*Primary Examiner*—Jean M. Corrielus
(74) *Attorney, Agent, or Firm*—Fish & Richardson P.C.

(57) ABSTRACT

A system and method for generating a taxonomy is provided in which the taxonomy is generated based on clusters of phrases and a topical library. The taxonomy permits a user of a text processing system to rapidly search through a database and find relevant documents since the classifications in the taxonomy are narrow enough to limit the number of documents classified in each of the classifications.

20 Claims, 7 Drawing Sheets

U.S. PATENT DOCUMENTS

| | | | |
|---|---|---|---|
| 6,205,456 B1* | 3/2001 | Nakao | 715/531 |
| 6,233,575 B1* | 5/2001 | Agrawal et al. | 707/6 |
| 6,266,681 B1 | 7/2001 | Guthrie | |
| 6,271,843 B1 | 8/2001 | Lection et al. | |
| 6,374,241 B1* | 4/2002 | Lamburt et al. | 707/6 |
| 6,389,462 B1 | 5/2002 | Cohen et al. | |
| 6,401,077 B1 | 6/2002 | Godden et al. | |
| 6,415,319 B1 | 7/2002 | Ambroziak | |
| 6,424,982 B1 | 7/2002 | Vogel | |
| 6,502,191 B1 | 12/2002 | Smith et al. | |
| 6,519,586 B1 | 2/2003 | Anick et al. | |
| 6,571,240 B1 | 5/2003 | Ho et al. | |
| 6,665,681 B1* | 12/2003 | Vogel | 707/101 |
| 6,697,793 B1* | 2/2004 | McGreevy | 707/1 |
| 6,741,981 B1* | 5/2004 | McGreevy | 707/3 |
| 6,823,333 B1* | 11/2004 | McGreevy | 707/4 |

OTHER PUBLICATIONS

Neuss et al., "Conceptual Analysis of Resource Meta-information", http://www.informatik.th-darmstadt.de/~neuss/www3/www3.html, Jul. 1998, pp. 1-14.

Quintana et al., "Graph-based Retrieval of Information in Hypertext Systems", SIGDOC'92, 1992, pp. 157-168.

Salton et al., "Selective Text Utilization and Text Traversal", Hypertext '93 Proceedings, Nov. 1993, pp. 131-144.

Salton et al., "Automatic Text Decomposition and Structuring", Information Processing & Management, vol. 32, No. 2, Feb. 1996, pp. 127-138.

Agosti et al., "On the use of Information Retrieval Techniques for the Automatic Construction of Hypertext", Information Processsing & Management, vol. 33, No. 2, Mar. 1997, pp. 133-144.

Tan et al., "RADA-A Research and Development Advisor Incorporating Artificial Intelligence Techniques and Expert System Approaches", Expert Systems with Applications, vol. 1, 1990, pp. 171-178.

P. Willett, "Recent Trends in Hierarchic Document Clustering: A Critical Review", Information Processing & Management, Elsevier, vol. 24, No. 5, 1988, pp. 577-597.

Salton et al., "Automatic Text Decomposition and Structuring," vol. 32, No. 2, Mar. 1, 1996, pp. 127-138.

C J Crouch, "A Cluster-Based Approach to Thesaurus Construction," Precedings of the International Conference on Research and Development in Information Retrieval, vol. Conf. 11, Jun. 13-15, 1988, pp. 309-320.

Susan Gauch et al., "Structure-Based Navigation of Technical Texts," Second Annual Symposium on Document Analysis and Information Retrieval, Apr. 26-28, 1993, Las Vegas, NV, pp. 367-377.

Anick and Vaithyanathan, "Exploiting Clustering and Phrases for Context-Based Information Retrieval," *Proceedings of the 20th Annual International ACM-SIGIR Conference on Research and Development In Information Retrieval*, Jul. 27-31, 1997, Philadelphia, PA, pp. 314-323.

Shatz et al., "Interactive Term Suggestion for Users of Digital Libraries: Using Subject Thesanri and Co-occurrence Lists for Information Retrieval," *Proceedings of the 1st ACM International Conference on Digital Libraries*, Mar. 20, 1996, Bethesda, MD, pp. 126-133.

\* cited by examiner

Topical Library ← 70

Disease Areas
Accidents & Injuries
fracture
burn
trauma
sprain
strain
reperfusion
stroke
wound
ulcer

FIG. 5

Taxonomy, as built by Semio Taxonomy ← 80
fracture
    bone fracture
        @license chrysalin
        @month duration
        @nonunion fracture
        @sick funds
        @sign marketing
    fracture healing
    fracture intervention trial
        ^called alendronate
        @hip fracture     } 82
        @participant received alendronate
hip fracture
        ^called alendronate
        @fracture intervention trial
        @participant received alendronate
nonunion fracture
        @bone fracture
        @month duration
        @sick funds

FIG. 6

Final taxonomy after integration of extracted taxonomy onto topical library
Disease Areas
    Accidents & Injuries    / 90
        fracture
            bone fracture
                ^distribution agreement
                ^license chrysalin
                ^month duration
                ^nonunion fracture
                ^sick funds
                ^sign marketing
            fracture healing
            fracture intervention trial
                ^called alendronate
                ^hip fracture
                ^participant received alendronate
            hip fracture
                ^called alendronate
                ^fracture intervention trial
                ^participant received alendronate
            hip fracture surgery
                ^hip bone
                ^key measurement

FIG. 7

SYSTEM AND METHOD FOR GENERATING A TAXONOMY FROM A PLURALITY OF DOCUMENTS

CROSS-REFERENCE TO RELATED APPLICATION

This application is a continuation application of and claims priority to U.S. application Ser. No. 09/289,174, filed on Apr. 9, 1999 now U.S. Pat. No. 6,665,681. The disclosure of the prior application is considered part of and is incorporated herein.

BACKGROUND

This invention relates generally to a system and method for processing a document and in particular to a system and method for generating a list of classifications (a taxonomy) from a plurality of phrases which are extracted from a set of documents.

Various factors have contributed to the storage of vast amounts of textual data information in computer systems and computer databases. The dramatic increase in the storage capacity of computer storage devices, such as hard disks, tape drives and the like and a decrease in the cost of these higher capacity computer hard drives are factors. Other factors include an increase in the transmission speed of computer communications, an increase in the processing speed of personal computers and an expansion of various computer communication networks, such as a bulletin board or the Internet. People therefore currently have access to the large amounts of textual data stored in these databases. However, although the current technology facilities the storage of and the access to this textual data, there are new problems that have been created by the vast amount of textual data that is now available.

In particular, a person trying to access the textual data in these computer databases needs a system for analyzing and processing the data in order to retrieve the desired information quickly and efficiently without retrieving extraneous information. In addition, the person trying to access the information needs an efficient system for condensing each large document into a plurality of phrases (one or more words) which characterize the document so that the person can browse the phrases and understand the document without actually viewing the entire document. It is also desirable to be able to automatically generate a classification system based on the extracted phrases stored in the computer database so that a person may use the classification system to browse through the database and focus in on the most relevant documents or pieces of textual data in the computer database. The classification system may be known as a taxonomy which consists of one or more subject matter headings with sub-headings reflecting the phrases extracted from the documents in the database.

To generate a typical subject matter classification system, a person must manually generate a classification system into which the one or more pieces of textual data in the database may then be manually or automatically classified. Thus, the typical classification system is manually generated and does not use the extracted phrases from the documents in the database to create the classification system. Therefore, the typical classifications are generally very broad reflecting the inability to more accurately classify the documents since the exact contents of the documents are not known. Thus, the typical classification may permit the user to select only a broad category which probably then contains too many documents to easily review. In addition, for each different database, a new classification system must be manually generated which is slow and time consuming.

Thus, it is desirable to provide a taxonomy generation system and method which solves the above problems and limitations with conventional classification systems and it is to this end that the present invention is directed.

SUMMARY

A system and method for generating a taxonomy in accordance with the invention is provided in which the phrases extracted from the plurality of documents or pieces of textual data stored in the database may be used to automatically generate a taxonomy for the database. The generated taxonomy is unique to the particular database (since it is based on the phrases extracted from the database) and permits a searcher in the database to rapidly find documents within the database since the taxonomy has more detail than a typical classification system. Thus, a search through the taxonomy may reduce the number of documents which the user must review. In addition, the taxonomy generation system may automatically generate a taxonomy for any database provided that key phrases from documents within the database are available.

In more detail, a broad topical library is manually generated and used to provide a structure for the taxonomy. The topical library may be of the same broad level of detail as a typical classification system. Next, the phrases extracted from the documents within the database may be clustered and mapped to form maps illustrating the relationships between the phrases within the documents. The phrases in the maps which are connected to the most other phrases in the map, known as leaders, may be used to form the first level of the taxonomy underneath the topical index. Next, phrases which are related to the leaders based on the clustering form the next level of the taxonomy and so on until the taxonomy has been automatically generated. In this manner, the taxonomy generated reflects the actual phrases contained in the database so that it is more accurate than typical classifications.

Thus, in accordance with the invention, a system for generating a taxonomy for a database is provided including a database having a plurality of pieces of text and a plurality of phrases extracted from the pieces of text wherein the phrases are associated with one or more other phrases. A leader phrase from the phrases in the database is identified wherein the leader phrase is associated with a predetermined number of other phrases in the database. A first level of a taxonomy is generated based on the identified leader phrases wherein the leader phrases form a first level of headings in a hierarchical topical outline. A second level of the taxonomy is generated based on phrases in the database associated with the leader phrases wherein the phrases are sub-headings underneath the leader phrases with which they are associated. The generated taxonomy reflects the phrases extracted from the pieces of text in the database so that a user searches through the database using the final taxonomy.

DESCRIPTION OF THE DRAWINGS

FIG. 5 illustrates an example of a topical library;

FIG. 6 illustrates an example of a taxonomy generated in accordance with the invention;

FIG. 7 illustrates an example of a final taxonomy incorporating the taxonomy of FIG. 6 and the topical library of FIG. 4 in accordance with the invention;

DETAILED DESCRIPTION

The invention is particularly applicable to a system for generating a taxonomy from English language documents and it is in this context that the invention will be described. It will be appreciated, however, that the system and method in accordance with the invention has greater utility, such as to document in other languages and to any other types of pieces of text that may be stored in a database. To better understand the invention, a text processing system will now be described.

Figure 1:
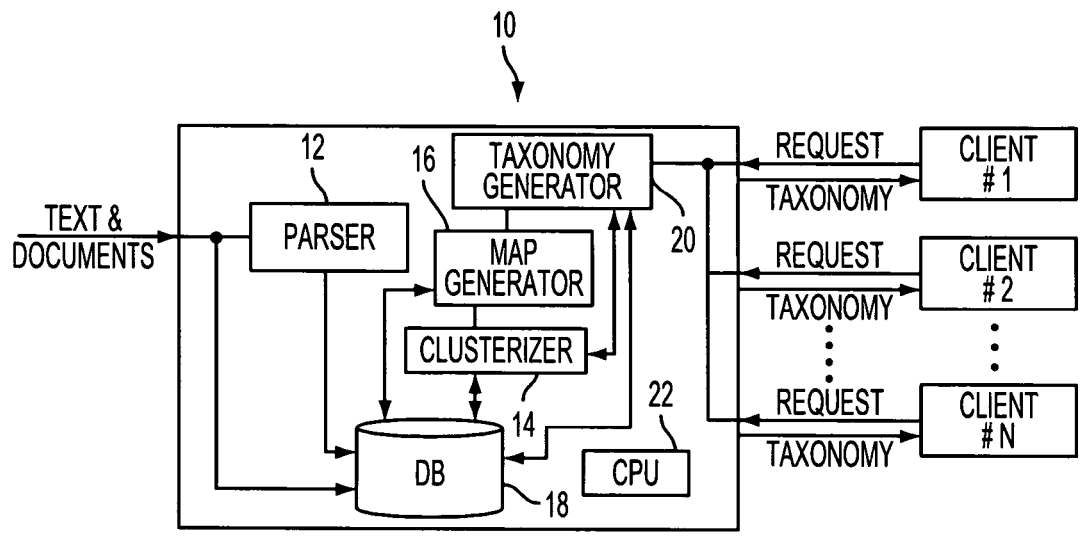
FIG. 1 is a block diagram of a text processing system.

FIG. 1 is a block diagram of a text processing system 10. The text processing system 10 may include a parser 12, a clusterizer 14, a map generator 16, a database (DB) 18, a taxonomy generator 20 and a central processing unit (CPU) 22. The parser, the clusterizer, the map generator, and the taxonomy generator may all be separate software applications stored in the memory (not shown) of the text processing system 10 which are executed by the CPU 22. The text processing system may receive one or more pieces of text, such as stories, press releases or documents, and may generate a searchable taxonomy which may be searched by one or more client computers (Client #1, Client #2 and Client #N). To generate the searchable taxonomy, each piece of text may be received by the parser 12 which processes each piece of incoming text and generates one or more key phrases for each piece of text which characterizes the piece of text. The key phrases may be stored in the database 18. Once the key phrases are extracted from each piece of text, the clusterizer 14 may generate one or more clusters of the key phrases based on the relationships between the phrases. The clusters generated may also be stored in the database 18. The map generator 16 may use the generated clusters in the database in order to generate a graphical map showing the relationships of the key phrases within the various pieces of text to each other so that a user of the system may easily search through the database of pieces of text by viewing the key phrases of the pieces of text. The clusters may also be used to generate the taxonomy in accordance with the invention as described below with reference to FIGS. 2–9. The database 18 may also store a topical library, as described below with reference to FIG. 5, which also may be used to generate the taxonomy. Additionally details about the clusterizer and the map generator are disclosed in co-pending U.S. patent application Ser. No. 08/801,970 which is owned by the assignee of the present invention and which is incorporated herein by reference. The text processing system may be implemented in a variety of manners including a client/server type computer system in which the client computers access the server via a public computer network, such as the Internet.

In operation, a client computer may access the text processing system 10 via a computer network, such as the Internet, using a browser application. The text processing system may generate a user interface showing the top level of the taxonomy previously generated. The user may then select a particular subject matter from within the taxonomy and another level of the taxonomy will be provided to the user. As some point, the user interface will also provide the user with the ability to look at documents which satisfy a given taxonomy classification. The interaction with the user will be described in more detail with reference to FIGS. 8 and 9. Now, the taxonomy generator 20 in accordance with the invention will be described.

Figure 2:
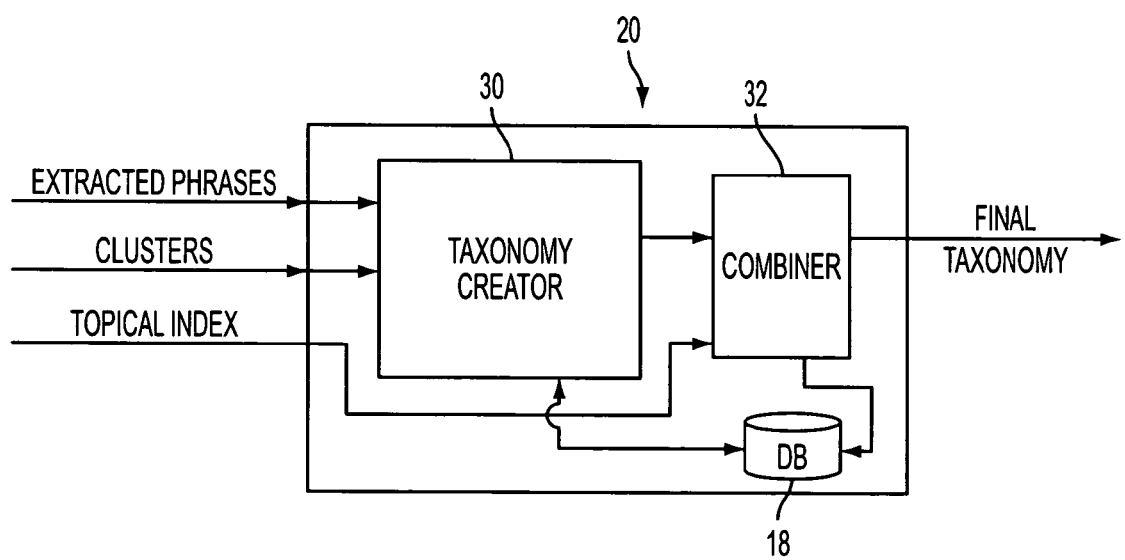
FIG. 2 is a block diagram of a taxonomy generation system in accordance with the invention.

FIG. 2 is a block diagram of the taxonomy generator 20 in accordance with the invention. The taxonomy generator 20 may include a taxonomy creator 30, a combiner 32 and the database 18 from the text processing system. The taxonomy generator 20 may receive the extracted phrases from the parser, the clusters from the clusterizer (both of which are stored in the database 18) and a topical library/index which may also be stored in the database 18. The topical library may be a high level classification of subject matter within a particular area such as might be available in a typical text processing system for searching through the document in the database. The extracted phrases and the clusters may be input to the taxonomy creator 30 which generates a taxonomy from the extracted phrases and the clusters. An example of the taxonomy generated will be described below with the reference to FIG. 6. The taxonomy from the taxonomy creator is output to the combiner 32 which then combines the taxonomy with the topical library to generate a final taxonomy. The final taxonomy may be searched by a user accessing the text processing system. Since the final taxonomy has been created from the extracted phrases and the clusters, the final taxonomy reflects the documents in the database more accurately than a typical classification system which has no association with the documents in the database. Now, a method for generating a taxonomy in accordance with the invention will be described.

Figure 3:
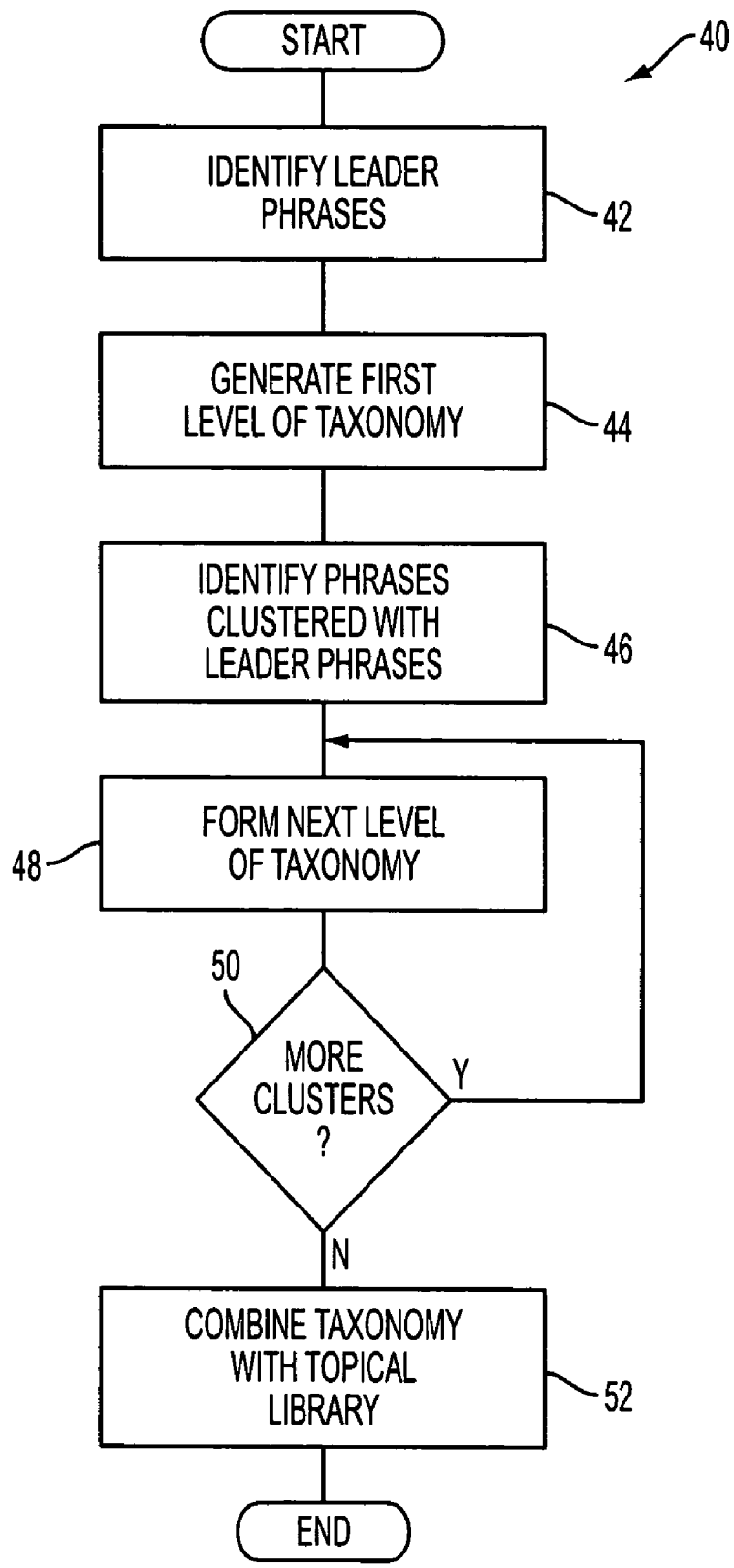
FIG. 3 is a flowchart illustrating a method for generating a taxonomy in accordance with the invention.

FIG. 3 is a flowchart illustrating a method 40 for generating a taxonomy in accordance with the invention. The method begins at step 42 in which the clusters received by the taxonomy system are analyzed to identify the leader clusters. The leader clusters are phrases in a map, as described below, which have associations (as shown by the lines in the map) with a large number of other phrases. The leader clusters tend to be broader phrases than the less connected other clusters so that the leader clusters form the best broad subject matter classifiers for the documents in the database. The leader clusters may then be used to form the first level of the taxonomy in step 44. In particular, the leader phrases are arranged in a hierarchical outline format as shown in FIG. 6. Next, the phrases associated with the leader phrases (those phrases with links to the leader phrases) are identified in step 46 and the next level of the taxonomy is generated from these clusters in step 48. In particular, the phrases related to each leader phrase are arranged underneath the leader phrase in a hierarchical relationship to form more specific sub-headings. Next, the taxonomy generator determines if there are any more phrases which are going to be added into the taxonomy based on the complexity and depth of the map. If there are more clusters, the method returns to step 48 and generates the next level of the taxonomy. If there are no more clusters to process, the taxonomy generated is combined with a topical library in step 52 to generate a final taxonomy in accordance with the invention. Now, an example of generating a final taxonomy from a map showing one or more clusters of phrases and a topical library will be described.

Figure 4:
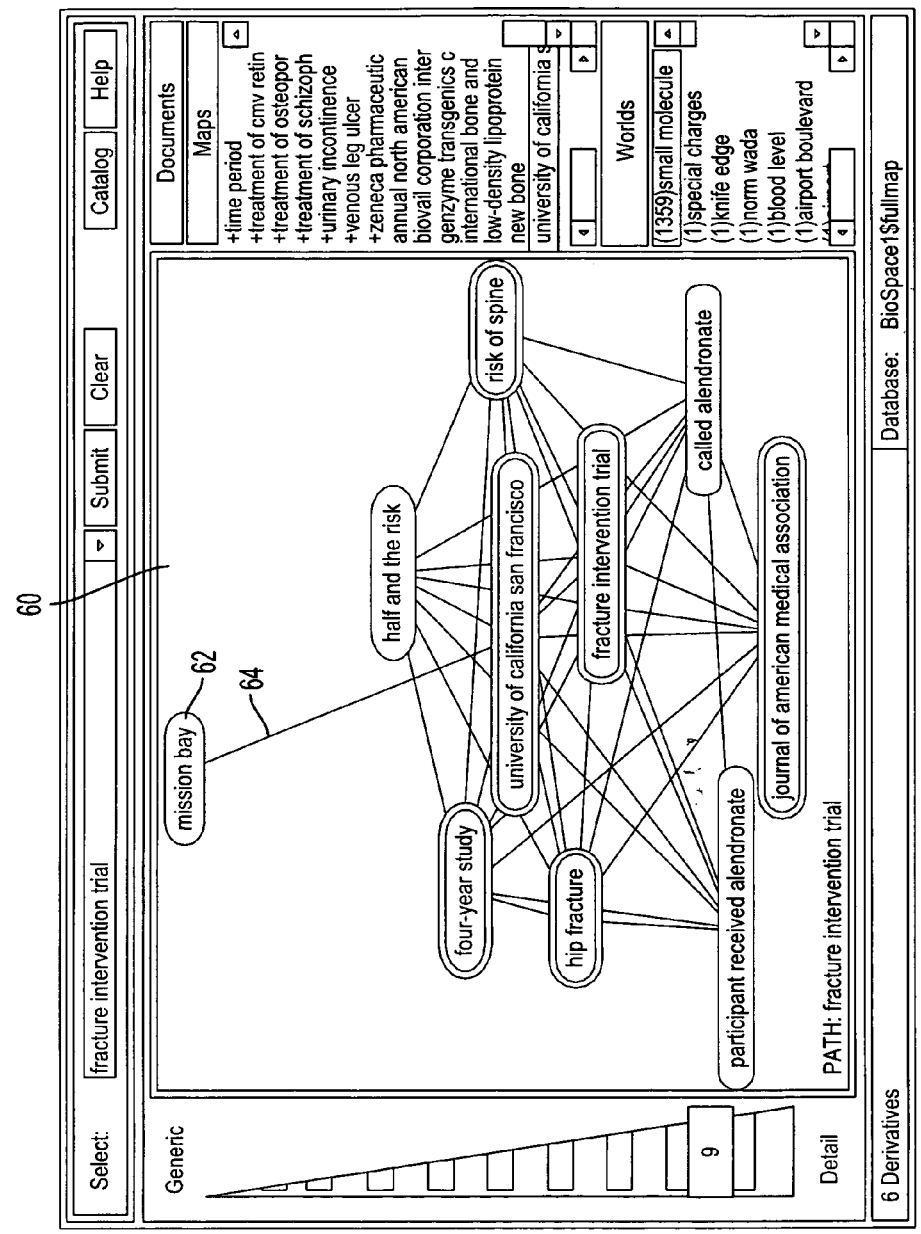
FIG. 4 is a diagram illustrating a map containing clustered phrases.

FIG. 4 is a diagram illustrating a map 60 containing a plurality of clustered phrases. The map 60 may be generated as described in the above incorporated co-pending patent application. As shown, the map contains one or more phrases 62 whose relationships to other phrases are shown by a line 64 connecting the two phrases. As described above, the leader phrase clusters may be used to generate a first level of the taxonomy. In this example, the phrase "fracture intervention trial" may be a leader phrase since it has a relationship with a plurality of other phrases. In contrast, the phrase "mission bay" is not a leader phrase. In this example, a taxonomy is generated using only the phrases shown in FIG. 4 will be described. It will be appreciated, however, that the taxonomy normally includes a plurality of phrases. To generate the taxonomy, a topical library 70 as shown in FIG. 5 may be used to define the broad subject matter classifications of the topics. In this example, the sub-classifications underneath the fracture heading will be generated in accordance with the invention based on the phrases shown in FIG. 4.

FIG. 6 illustrates an example of a taxonomy 80 generated in accordance with the invention based on the leader phrases shown in FIG. 4 and in particular the "fracture intervention trial" phrase. In particular, the phrase is located within the taxonomy and includes three sub-categories 82 in this example. In particular, the sub-categories may include the phrase "called alendranate", the phrase "hip fracture" and the phrase "participant received alendronate". As shown in FIG. 4, these phrases are related to the leader phrase and therefore appear as sub-headings underneath the leader phrase. Similarly, the leader phrase "hip fracture" is identified from FIG. 4 as a leader phrase and there are one or more phrases underneath it in the taxonomy. The symbols prior to the phrase in the diagram indicate that the phrase is contained elsewhere in the taxonomy. Referring back to FIG. 4, each of the phrases underneath a leader phrase has a relationship with the leader phrase so that those phrases become sub-categories underneath the leader phrase.

FIG. 7 illustrating a portion of a final taxonomy 90 generated when the generated taxonomy shown in FIG. 6 is combined with the topical library shown in FIG. 5. As shown, the final taxonomy generated in accordance with the invention contains more detail than the typical topical library. In addition, the headings (leader phrases) and the sub-headings of the taxonomy are generated from the pieces of text in the database so that the headings and sub-headings more accurately reflect the pieces of text in the database. Thus, it is easier to locate documents within the database using the automatically generated taxonomy in accordance with the invention. Now, several examples of the user interfaces for searching through the taxonomy in accordance with the invention will be described.

Figure 8:
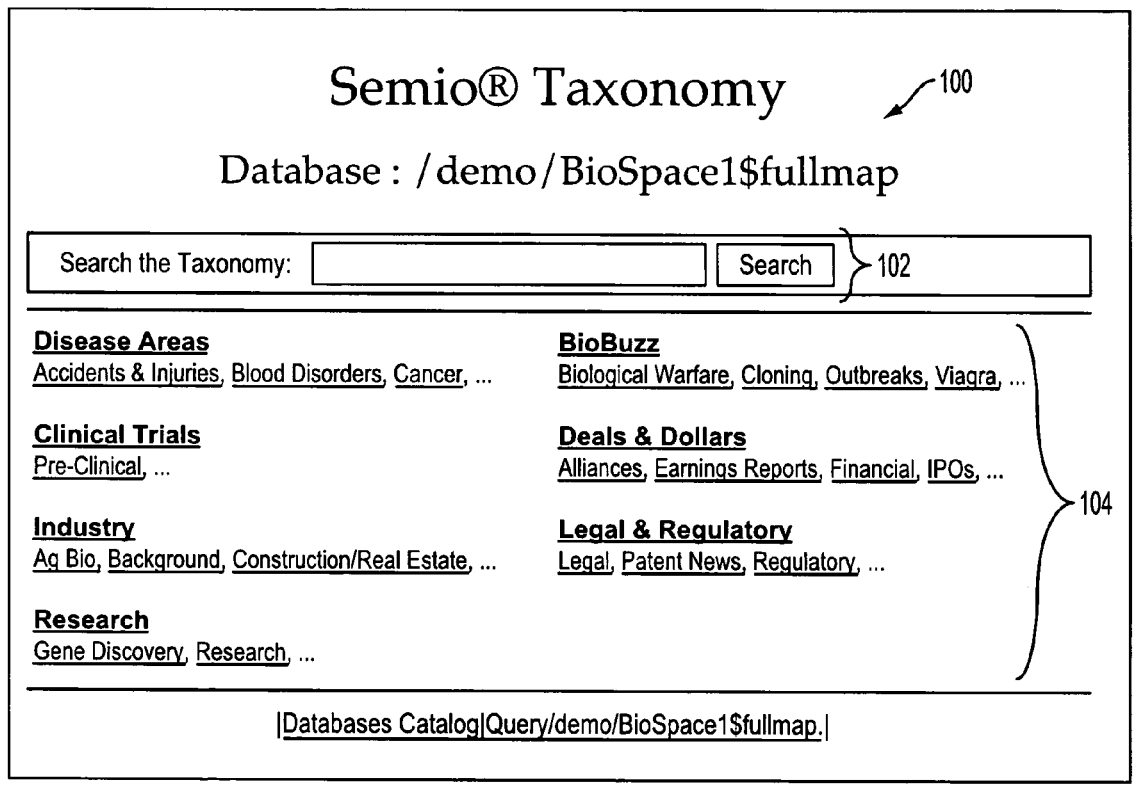
FIG. 8 illustrates an example of a user interface for searching a top level of the taxonomy in accordance with the invention.

FIG. 8 illustrates an example of a user interface screen 100 for searching a top level of the taxonomy in accordance with the invention. The user interface may include a keyword search portion 102 and a classification search section 104. The keyword search portion permits the user to enter keywords which will be compared against the taxonomy to generate a list of documents which match the keywords. The classification search portion 104 permits the user to browse through the high level classifications and click on any classification of interest. In this example, assume that the user clicks on the "Accidents & Injuries" sub-category underneath the "Disease Areas" heading. The user is then shown another user interface page which will now be described.

Figure 9:
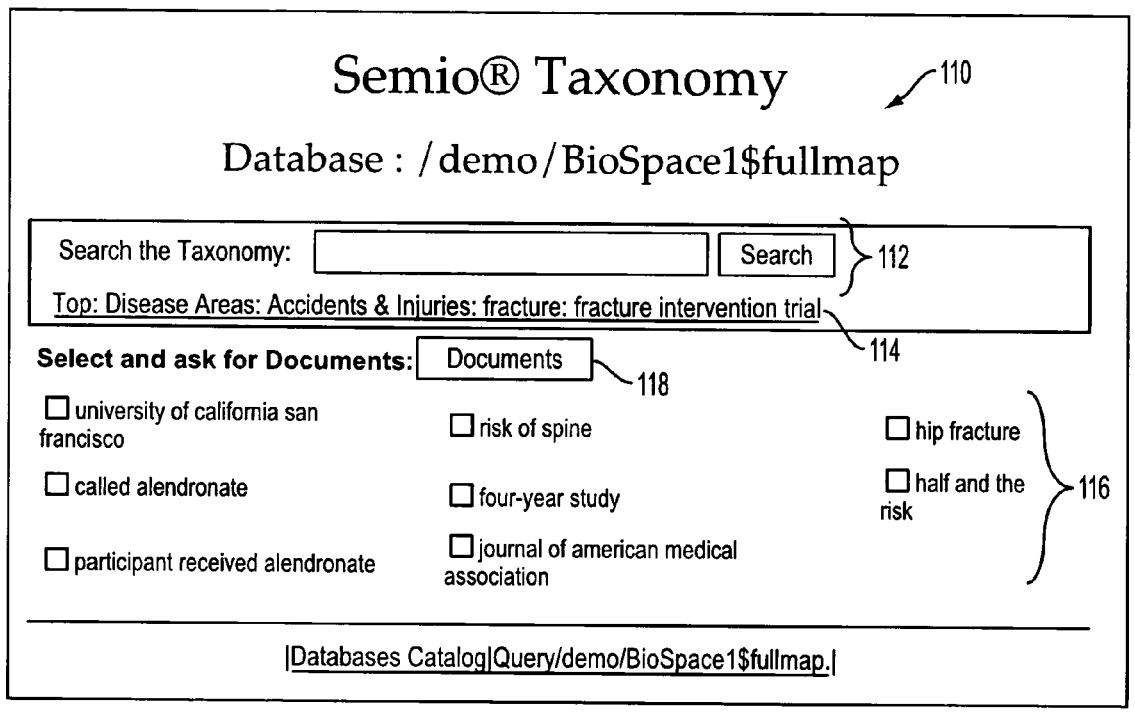
FIG. 9 illustrates an example of a user interface for searching a lower level of the taxonomy in accordance with the invention and for displaying the documents relating to the selected topics.

FIG. 9 illustrates an example of a user interface screen 10 for searching a lower level of the taxonomy in accordance with the invention. As shown, this screen may include a keyword search section 112 for keyword searching as above, a current search status line 114 which may list, for example, the current category within the taxonomy being searched and the path to get to that category, and a sub-classification section 116 for listing the sub-classifications and selecting them. In this example, the taxonomy does not have more specific classifications. Therefore, the selection of one or more sub-classification headings (a phrase associated with a leader phrase in this example) and the selection of a document button 118 by the user causes those documents within the selected one or more sub-classifications to be shown to the user of the system. In this manner, the use may rapidly narrow down the number of documents to be reviewed by using the more comprehensive taxonomy in accordance with the invention.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A computer-implemented method comprising:
    inputting text;
    extracting phrases from the text;
    constructing clusters of the phrases defining connections between the phrases;
    selecting leader phrases from the clusters that each have a pre-determined number of connections to other ones of the phrases; and
    defining a taxonomy that classifies categories of information within the text, based on the leader phrases.

2. The method of claim 1 wherein defining the taxonomy comprises defining a multi-level taxonomy having a first level of categories and a second level of categories.

3. The method of claim 2 wherein defining the multi-level taxonomy comprises:
    assigning the leader phrases to the first level; and
    assigning the other ones of the phrases that are connected to the leader phrases to the second level, in association with their respective leader phrases.

4. The method of claim 3 wherein defining the multi-level taxonomy comprises defining a third level of categories, and wherein defining the third level of categories comprises:
    determining sub-heading phrases that are not leader phrases and that are connected to the other ones of the phrases; and
    assigning the sub-heading phrases to the third level.

5. The method of claim 2 wherein defining the multi-level taxonomy comprises:
    assigning topics from a pre-determined topical library to the first level;
    associating each of the leader phrases with at least one of the topics; and
    assigning the leader phrases to the second level in association with their respective topics.

6. The method of claim 1 wherein constructing clusters of the phrases comprises constructing links between the phrases that are defined by the connections, such that a user of the taxonomy may follow the connections by selecting a desired one of the links.

7. The method of claim 1 comprising outputting the taxonomy as a tool for analyzing the text.

8. A system comprising:
a computer-based text processing system to generate a multi-level taxonomy that classifies content using linked phrases that have been extracted from the content, wherein a first level of the multi-level taxonomy includes a leader phrase selected from the phrases based on a number of links associated with the leader phrase; and
a user interface operable to output the multi-level taxonomy, such that a user proceeds from the first level to a second level of the multi-level taxonomy, wherein the second level includes connected phrases that are linked to the leader phrase.

9. The system of claim 8 comprising a topical library that includes topics associated with the content, wherein the text processing system is operable to access the topical library and include the topics within the multi-level taxonomy.

10. The system of claim 8 wherein the text processing system is operable to include a third level within the taxonomy, wherein the third level includes sub-phrases that are linked to the connected phrases.

11. The system of claim 8 wherein the text processing system comprises:
a parser operable to identify the phrases within the content; and
a clusterizer that is operable to determine the links between the phrases.

12. The system of claim 11 wherein the text processing system comprises a map generator that is operable to display the linked phrases.

13. The system of claim 8 wherein the text processing system is operable to receive the content from the user and output the multi-level taxonomy in response.

14. An apparatus comprising a computer-readable storage medium having instructions stored thereon, wherein a processor performs operations upon reading the instructions, the instructions including:
a first code segment for inputting documents, the documents including text;
a second code segment for extracting phrases from the text;
a third code segment for establishing connections between the phrases;
a fourth code segment for defining a leader phrase from among the phrases, based on a number of the connections associated with the leader phrase; and
a fifth code segment for defining a taxonomy in which the leader phrase is included at a first level.

15. The apparatus of claim 14 in which the fifth code segment includes secondary phrases directly connected to the leader phrase by the third code segment at a second level of the taxonomy.

16. The apparatus of claim 14 in which the fifth code segment includes tertiary phrases directly connected to the secondary phrases by the third code segment at a third level of the taxonomy.

17. The apparatus of claim 14 wherein the fifth code segment includes a sixth code segment for accessing topics from within a topical library that is associated with content of the documents, wherein the fifth code segment associates the leader phrase with one of the topics within the taxonomy.

18. The apparatus of claim 14 comprising a sixth code segment for outputting the taxonomy as a multi-level taxonomy, including the leader phrase at the first level and phrases connected to the leader phrase at a second level below the first level.

19. The apparatus of claim 18 including a seventh code segment for receiving a user selection of the leader phrase and for providing the second-level phrases in response thereto.

20. The apparatus of claim 19 wherein the seventh code segment includes an eighth code segment for outputting, in response to a further user selection of one of the second-level phrases, a document from among the documents that corresponds to the selected second-level phrase.

* * * * *